INVENTOR.
RUDOLF FRIEDRICH HÜBSCHER

United States Patent Office 3,043,633
Patented July 10, 1962

3,043,633
BRAKING SYSTEM FOR ROAD VEHICLES WITH
AIR CUSHIONING AND AIR BRAKES
Rudolf Friedrich Hübscher, Schaffhausen, Switzerland, assignor to George Fischer A.G., Schaffhausen, Switzerland
Filed Aug. 7, 1959, Ser. No. 832,399
Claims priority, application Switzerland Apr. 7, 1959
12 Claims. (Cl. 303—22)

The present invention relates to a device for the actuation of the brakes in road vehicles provided with air cushioning. The device is preferably employed with an indirect pneumatic brake.

The device operates as a brake control and prevents the skidding of the wheels. The braking force of each wheel of the vehicle, preferably a trailer, is selectively and individually controlled by the load on the respective wheel. A reversing valve directly or indirectly controlled by the brake pedal causes a pressure impulse to be given in a compressed-air line which is opposed to the braking action so as to release the brakes. When the brake is released, pressure in the control circuit is high, while the pressure in the control circuit is released when the brake is actuated so that the control circuit pressure can drop to zero. This control pressure impulse positively actuates a control valve between the compressed-air reservoir and the compressed-air brake. This manner of actuating a brake has been adopted from railway designs and it offers the security that the brakes are actuated although a trailer may have been disconnected or the control line damaged for some other reason. In addition, response time is shorter for long control lines because of the smaller volume of air that passes per unit time. In these systems a pressure reservoir must always be provided in front of the actuating members of the brake, i.e. on the actuating sides of the cylinders of indirect brakes. A control member or reversing valve, which is preferably incorporated in the trailer, opens and closes the connection between the reservoir and the brake cylinders in accordance with the reciprocal pressure, depending on the magnitude of the control impulse. When the brake is de-energized, the reservoir is continuously charged to maximum pressure via a check valve. In the newly developed air cushioning systems for vehicles, the compressor and the compressed-air reservoir must be dimensioned as large as possible so that the air pressure can be maintained in the air cushioning members.

The present invention has for a particular object, the provision of a brake control which adjusts the braking power of an individual wheel depending on the vertical load on the wheel. A further object of this invention is the provision of a safety brake which becomes automatically operative when the control line is ruptured or when there is a predetermined reduction in pressure of the air in the control line or in the reservoir.

The scope of this invention is limited to vehicles provided with an air cushioning system and an indirect compressed-air brake. The most important characteristic of the invention is the fact that each vehicle wheel is provided with at least one brake cylinder and that the compressed air from the air cushioning member associated with the wheel is supplied to the side actuating the brake while the compressed air supplied by the indirect braking system is supplied to the side that releases the brake. The actuating members may be designed as a double-acting cylinder or two single acting cylinders.

A further characteristic of one modification of the invention is a short-stroke diaphragm cylinder which directly actuates a disk brake.

Various embodiments of the invention are shown in the drawing, in which:

FIG. 6 is a section of the short-stroke diaphragm cylinder according to FIG. 5.

Figure 1:
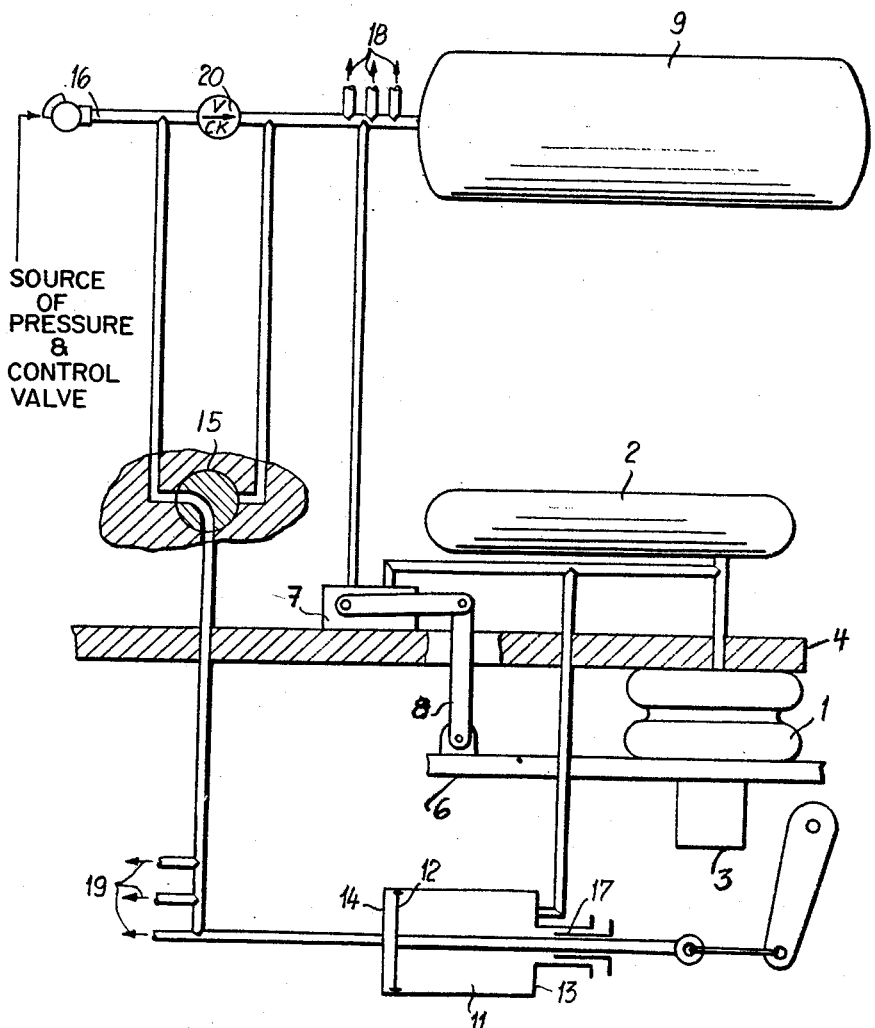
FIG. 1 is a circuit diagram according to this invention for a single wheel.

FIG. 1 shows an air cushioning member 1 directly connected to a reservoir volume 2. More specifically, the air spring element 1 is arranged between axle 3 pivotally connected to the vehicle chassis 4, and the vehicle chassis 6. The axle 3 transmits only vertical supporting forces. Moreover, axle 3 is through the intervention of the auxiliary frame 6 of the axle and through the intervention of a linkage system 8 connected to the control valve 7. In general, said control valve 7 comprises a spring, a dash pot, and a three-way valve. Control valve 7 controls a constant distance between the vehicle axle 3 and the vehicle chassis 4 and thus also between the ground and the vehicle chassis even when the vehicle or its springs are differently loaded. In other words, these members cooperate to regulate the level of the axle relative to the vehicle frame so that it is at a constant height under different loads. The latter members are commonly associated in a single assembly. The air supply is completed from the main compressed-air reservoir 9. Release of air from the air-cushioning system is effected by valve 7. If a sufficiently large air compressor is available, the control valve 7 may also be connected to the axle directly. The double-acting brake actuating cylinder 11 with the piston 12 is directly connected with the system of the air cushioning member 1 and, respectively, its reservoir 2, on the actuating side 13. The brake releasing side 14 of the double-acting cylinder 11 is connected with the control line 16 of the indirect brake system via a three-way valve 15. Control line 16 has connected thereto a source of pressure and a control valve as indicated in FIG. 1 by the legend. In order to enable the brake to be released when there is a shortage of air in the control line 16 or when the trailer is uncoupled, the release side 14 may be connected with the reservoir 9 by means of the three-way valve or cock 15. The three-way valve 15 can thus operate as a pneumatic hand brake. Installation of an additional mechanical hand brake is not interfered with thereby. The piston rod of the double-action piston should be sealed as efficiently as possible by means of a stuffing box 17 or by adequate sealing means. The double-action cylinder may naturally be replaced by two single-action cylinders which operate in opposite directions. It is further of advantage to provide two air cushioning members or diaphragm bodies operating in opposite directions as actuating cylinders rather than a double-action cylinder, because they are not equipped with a stuffing box. Naturally an air cushioning member may be provided on the brake actuating side alone, which eliminates air losses on that side, while an ordinary brake cylinder is arranged on the brake releasing side. Further connections for supply lines to the air cushioning members of the other three wheels are indicated at 18, and the connections for a further three brake cylinders (brake releasing side) are indicated at 19. The reference numeral 20 designates a check valve which enables the reservoir 9 to be refilled when the brake is released, i.e. under full control pressure.

Figure 2:
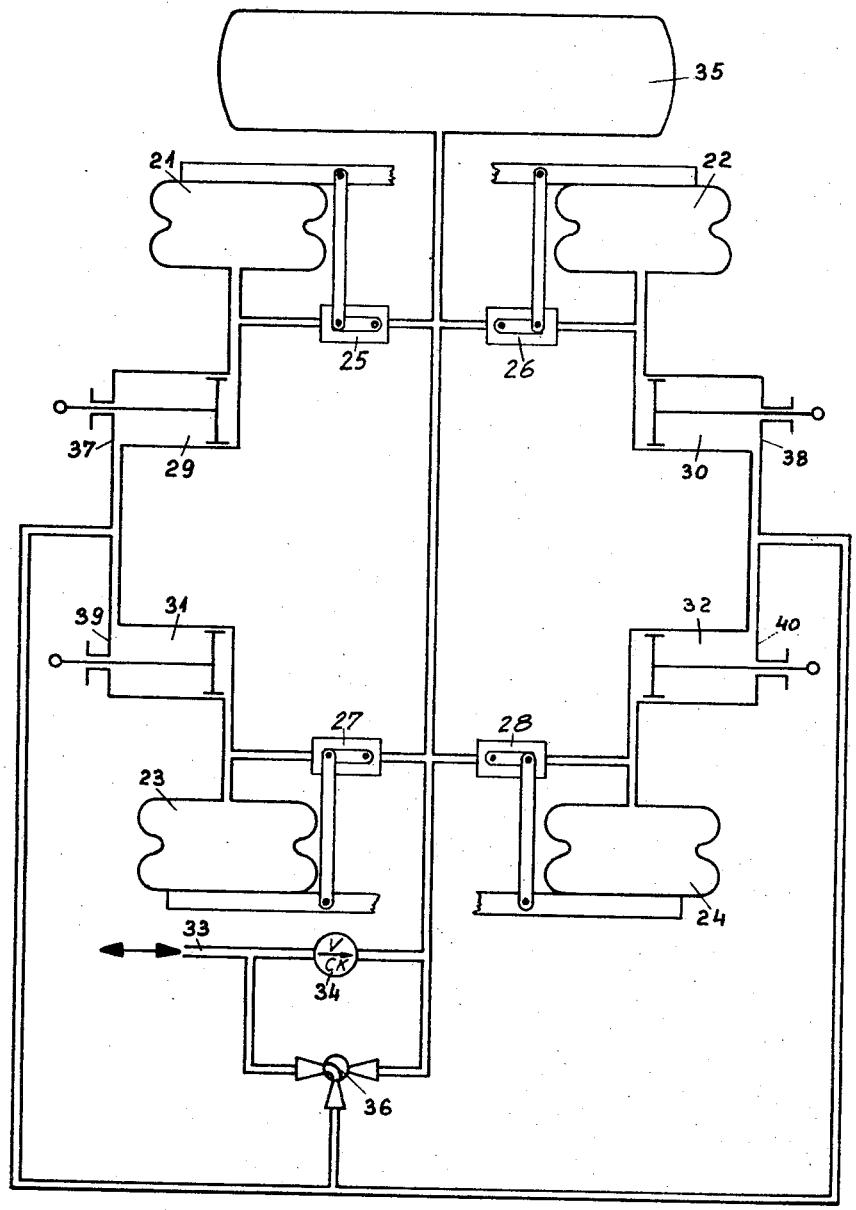
FIG. 2 is a circuit diagram according to this invention for four wheels.

In FIG. 2 the reference numerals 21, 22, 23, 24 designate four air cushioning members with their control valves 25, 26, 27, 28 of a four-wheel vehicle, which are indicated diagrammatically. The associated double-action brake cylinders are shown diagrammatically at 29, 30, 31 and 32. Connection of the indirect braking air is effected by line 33, on the one hand to the reservoir 35 via a check valve 34, and on the other to the brake releasing cylinder openings 37, 38, 39, 40 of the double-action brake cylinders 29, 30, 31, 32 via a three-way valve 36. The three-way valve 36 may again be employed as a compressed-air hand brake.

Figure 3:
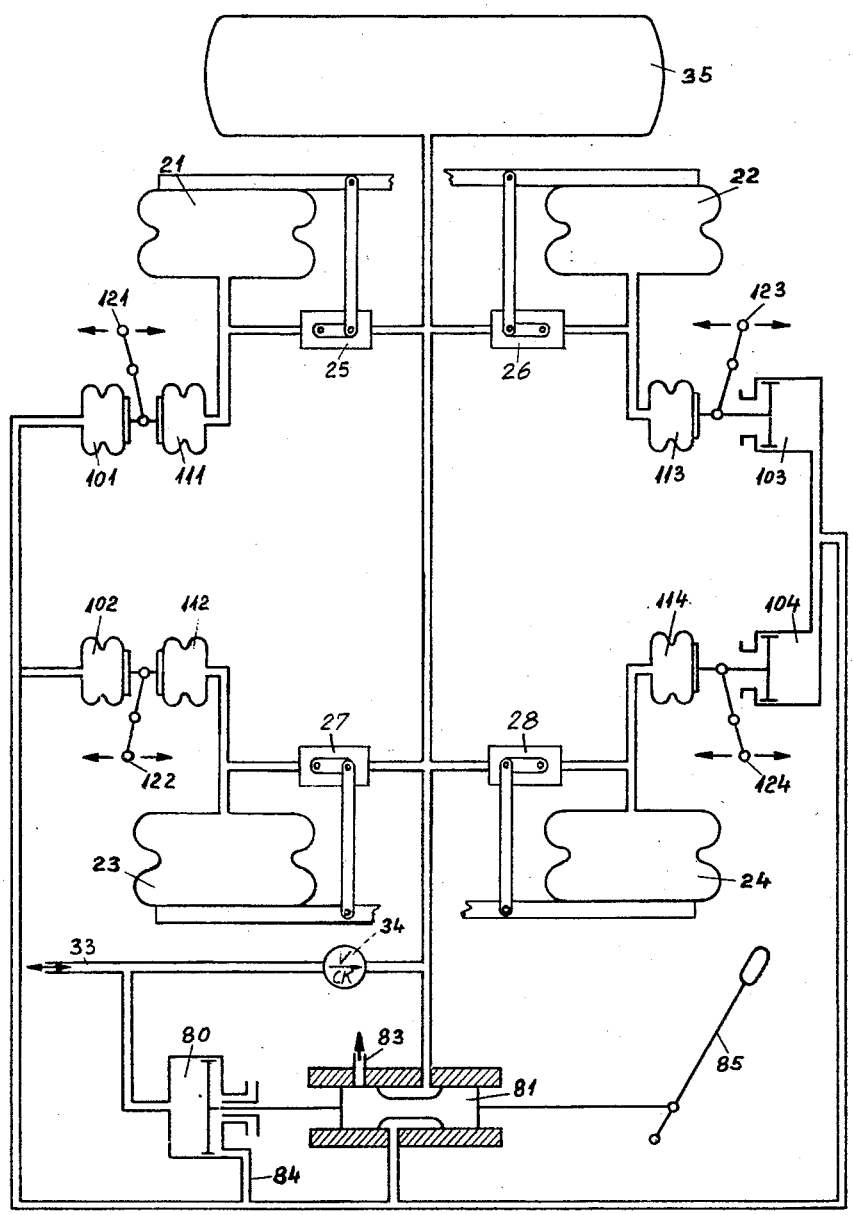
FIG. 3 shows an alternative circuit with an indirect connection of the brake releasing members to the control line.

FIG. 3 shows a diagram corresponding to that of FIG. 2 with an indirect connection of the brake releasing members 101, 102, 103, 104 with the control line. At the same time the double-action cylinders are replaced by two separate actuating members operating in opposite directions and associated with each wheel, as previously described. One the brake actuating side, four fully closed air cushioning members or diaphragm bodies 111, 112, 113 and 114 are provided and connected with the air system of the air cushioning member of the associated wheel. The brake releasing side is alternatively connected, with two diaphragm bodies 101, 102 and two single-action cylinders 103, 104, with the indirect brake system. The associated brake levers 121, 122, 123, 124 enable any desired transformation ratio to be selected. With this arrangement it is furthermore possible to provide the actuating side and the releasing side with piston areas of different size and with different stroke-pressure characteristics. In the presence of overpressure relative to the reservoir 35, the control line 33 may supply air through the check valve 34. With this arrangement the brake releasing cylinders 101, 102, 103 and 104 are always supplied with compressed air from the air reservoir 35 as follows:

(1) With the control line 33 connected and adjusted, via a slide valve 81 in a control cylinder 80 actuated by the indirect control pressure. When the control pressure rises, the slide 81 establishes communication between the pressure reservoir 35 and the brake releasing cylinders 101, 102, 103, 104 as shown in FIG. 3. When the control pressure drops, the slide 81 is shifted to the left and connects the brake releasing cylinders 101, 102, 103, 104 with the vent 83 of the slide 81. Connection 84 of the rear side of the control cylinder 80 with the system of the brake releasing cylinders 101, 102, 103, 104 establishes a return line enabling accurate adjustment to be obtained.

(2) With the control line 33 disconnected, e.g. when the trailer has been purposely or accidentally uncoupled, the above connections may be established manually by means of the compressed-air hand-brake lever 85 via the same slide 81.

Naturally, the slide 81 may also be replaced by a pneumatically controlled three-way valve or cock.

Figure 4:
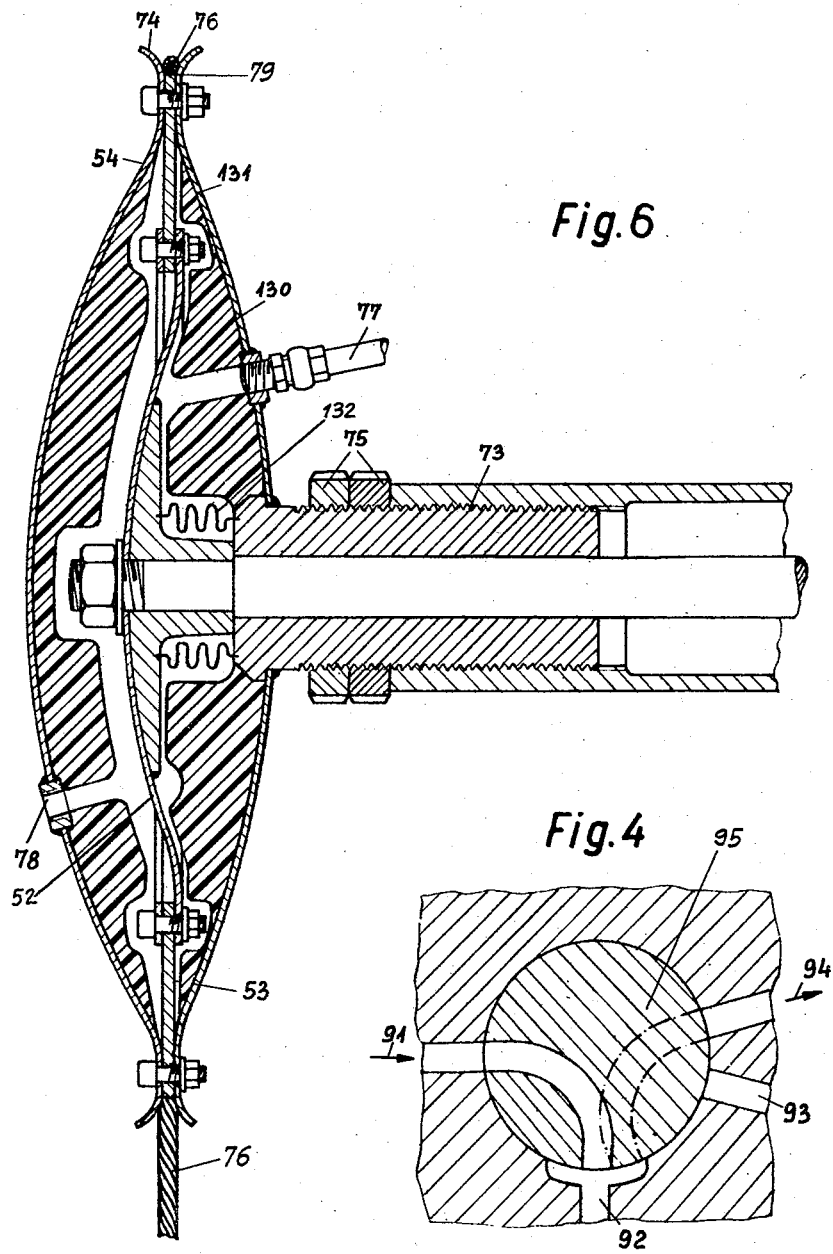
FIG. 4 shows a modified design of the reversing valve for a compressed-air hand brake.

With the design according to FIG. 2, it is again possible to provide a direct vent on the cock itself according to FIG. 4 for the pneumatic hand brake and, respectively, the three-way cock 36, in order to avoid passing possible flow obstacles in the control line. Connection of the control line is effected at 91, that of the brake cylinders at 92. The compressed-air reservoir is connected at 93. The reference numeral 94 designates the vent to the atmosphere. Rotation of valve member 95 enables the brake to be supplied with air or drained, so that the brake is released or actuated.

Figure 5:
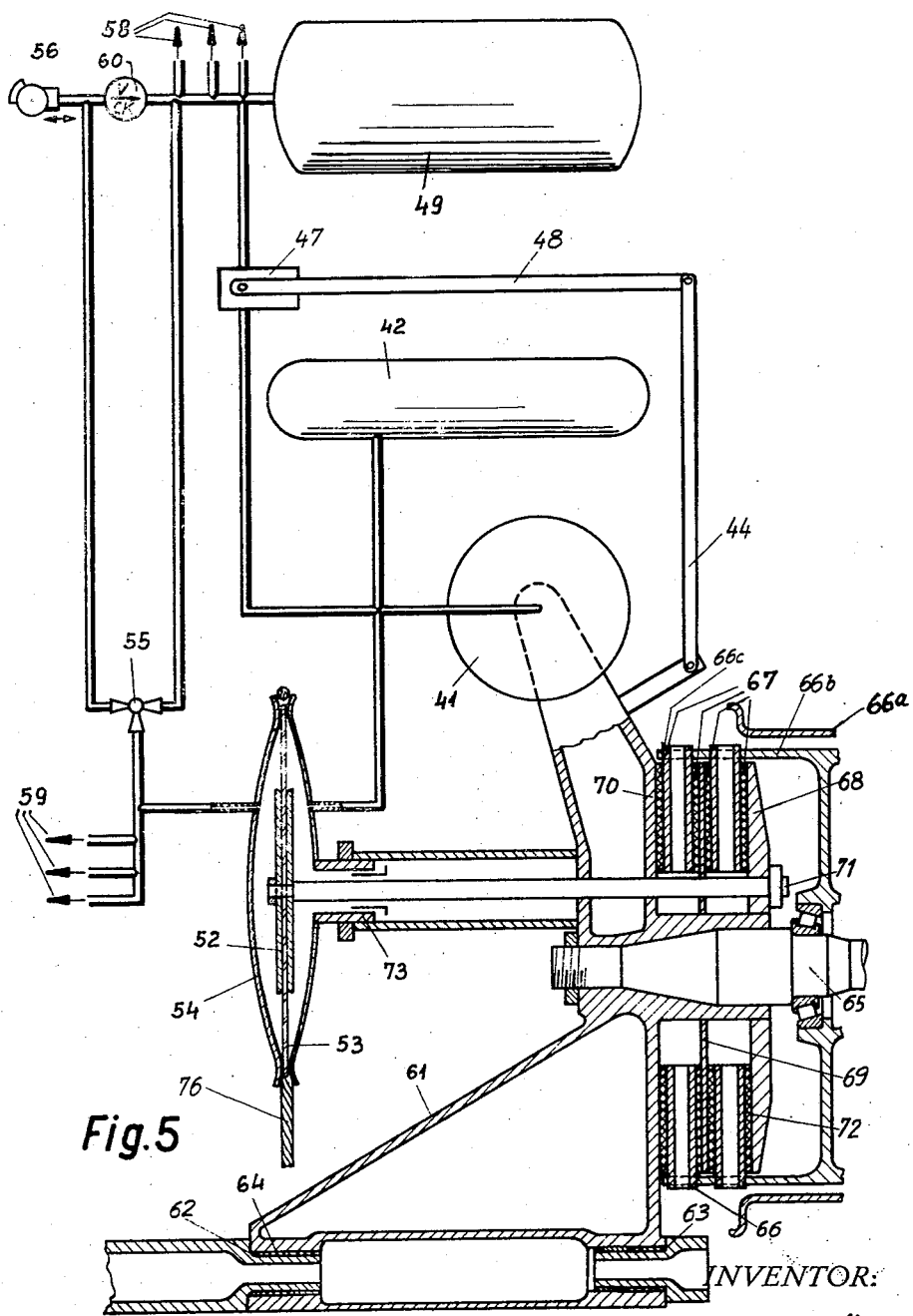
FIG. 5 is a section of a particular embodiment of the invention equipped with a disk brake and a short-stroke diaphragm cylinder.

FIG. 5 is a section of a crank-arm oscillation axle with an incorporated disk brake which is actuated by a double-action short-stroke diaphragm cylinder. The air cushioning member and its supply lines are shown diagrammatically. The latter members correspond to the designs according to FIGS. 1 through 4 and show the air cushioning member 41, the additional volume air reservoir 42, the linkage 44 and 48, the compressed-air reservoir 49 of the control valve 47, the three-way valve 55, the control line connection 56, the connections for three further air cushioning assemblies 58, the connections for three additional brake assemblies 59 and the check valve 60. In addition to the members represented in FIGS. 1 through 4, FIG. 5 shows a section of the crank axle 61 with its two bearing points 62 and 63 which are preferably equipped with a bearing 64 formed of a plastic material. The axle journal 65 formed of a high-grade material may be separately installed. The disk brake comprises at least one rotor disk 66 driven by the vehicle wheel 66a as by the finger means 66b on the wheel engaging notch means 66c on the rotor base. The linings 67 are attached to stator disks 68, 69 and to the lateral closure wall 70 of the crank arm. The stator disks 68, 69 are arranged on the crank arm 61 so as to be displaceable but secured against rotation. For the present purpose, the linings are preferably designed so as to be eccentric or asymmetrical so that the linings located on the side of the pull rod 71 are substantially larger than those arranged on the opposite side 72. The relationship of the lining surfaces is determined by determination of the centre of gravity, or empirically. The linings should preferably be attached in a guide of the stator disk in such a manner that they can be radially removed without removing the wheel. This brake design requires actuation of the brake with a short stroke and very great power. The device according to this invention of the double-action cylinder is very well equipped for this function because the share of the frictional force of the stuffing box can be reduced to a fraction of the total braking power. This slight influence exercised on the braking power by additional frictional forces enables the locking regulator to be very accurately adjusted and full use for braking to be made of small differences in the wheel load. On the other hand, this requires a very short cylinder with a relatively large piston, to which the design employing diaphragms according to FIG. 5 is best suited. The piston is replaced by a dished disk 52 which has its outer portion sealedly secured, by means of a membrane 53, to the housing 54, which is preferably dished as well. Attachment of the housing 54 by means of a thread 73 enables the brake to be adjusted by rotating the whole housing. Rotation of the housing on the thread by a cable 76 further enables an auxiliary manually operable emergency brake to be provided in the event of the air supply being completely interrupted.

The crank axles may be replaced by some other design of an independent wheel suspension system.

FIG. 6 is a detail of a short-stroke diaphragm cylinder according to FIG. 5. By flanging the outer edge 74 of the diaphragm housing 54, a groove 79 is formed for a cable line for the emergency brake. As previously stated, the thread 73 is designed for adjusting the brake and for actuation of the brake manually in an emergency by cable 76. The initial position of the piston may be locked by means of the two adjusting nuts 75. The sealing against air leakage may be effected by any standard means, for instance a bellows, as indicated at 132. In order to actuate the brake, the air cushioning member or the additional volume is connected with the connection 77 while the indirect compressed-air spring is indirectly or directly connected with the connection 78. In order to avoid excessive consumption of compressed air and to keep the response time of the brake as short as possible, the dead volume of the short-stroke diaphragm cylinder may be filled with a filler 130 according to contour 131 and double hatching in FIG. 6. The filler or stopping should absorb as little air as possible or be provided with an air-tight surface so that no interior spring action occurs on expanding. Such a design of the diaphragm cylinder enables a relatively narrow control line for venting the brake cylinders to be used also on trailers, i.e. for the actuation of the brake from the traction vehicle without noticeable braking lag.

The advantages of the present invention reside mainly in the adjustment of the braking power to the wheel load. The wheels are safeguarded against locking. The retardation moments about the vehicle axles are substantially proportional to the moments of inertia. The vehicle obtains improved lateral guidance and directional stability. The brakes may be adjusted for more powerful action. The safety of the vehicles is considerably increased. The tires are protected.

The good properties of the disk brake contribute to improving this control, by way of example by rigid proportionality in the transmission ratio and by high thermal loading capacity. Air cushioning as such presupposes that the air lines are carefully sealed and that the compressed-air reservoir on the vehicle is sufficiently dimensioned to enable a pneumatic hand brake to be ingeniously installed for operation during some time when the trailer is disconnected and without resorting to an individual compressor. Additional security is obtained by the indirect brake: when the coupling is disengaged, the trailer is immediately stopped even if the compressed-air reservoir were to be empty.

Installation of the short-stroke diaphragm cylinder enables the brake to be made independent of frictional forces operative on the piston and in the linkage so that the locking regulation may be very finely adjusted so as to respond rapidly to greater or lesser loads.

Having now particularly described and ascertained the nature of my said invention and in what manner the same is to be performed, I declare that what I claim is:

1. In a vehicle braking system, said vehicle having a wheel and an individual air cushion for said wheel; a brake for said wheel, a double acting air motor means for said brake having a brake actuating side and a brake releasing side, means connecting the said brake actuating side of said motor means directly to the air cushion of the wheel, a supply of air under pressure, and control means operable for selectively connecting said brake releasing side of said motor means to said supply of air under pressure or to exhaust.

2. In a vehicle braking system, said vehicle having a plurality of wheels and an individual air cushion for each wheel; a brake for each said wheel, a double acting air motor means for each brake having a brake actuating side and a brake releasing side, a source of air under pressure, means including a regulator connecting said source of air under pressure to each said air cushion for supplying the air cushions with air, each regulator being sensitive to the load on the pertaining wheel to control communication between the pertaining air cushion and said source or the atmosphere or to entrap air in the air cushion to maintain the vehicle level, the brake actuating side of each said air motor means being connected directly with the said air cushion of the pertaining wheel, and control means selectively operable for connecting said brake releasing sides of said air motor means to said supply of air under pressure or to exhaust.

3. A vehicle braking system according to claim 2 in which each said air motor means comprises a cylinder and a double acting piston therein.

4. A vehicle braking system according to claim 2 in which each said air motor means comprises a pair of single acting piston-cylinder means connected in opposed relation.

5. A vehicle braking system according to claim 2 in which each said air motor means comprises a pair of diaphragm motor means arranged in opposed relation.

6. A vehicle braking system according to claim 2 in which each said air motor means comprises a single acting piston-cylinder means and a diaphragm motor means arranged in opposed relation thereto.

7. A vehicle braking system according to claim 1 in which the said brake is a disk brake and the said air motor means pertaining thereto comprises at least one diaphragm motor having a direct mechanical connection to said brake.

8. A vehicle braking system according to claim 1 in which the said brake is a disk brake comprising a rotor disk connected to turn with the wheel, a stator disk on each side of the rotor disk held against rotation but movable toward the rotor disk, said air motor comprising a diaphragm motor, and a reciprocal rod extending from the diaphragm motor through said stator disks for actuating the said stator disks into pressure and braking engagement with said rotor disk.

9. A vehicle braking system according to claim 8 in which the diaphragm motor includes a housing, and means adjustably supporting said housing for movement in the direction of movement of said reciprocal rod whereby the brake can be actuated by movement of the said housing.

10. A vehicle brake system according to claim 8 in which the diaphragm motor includes a housing, screw threaded means supporting the housing for movement in the direction of movement of the said reciprocal rod upon rotation of the housing whereby adjustment or actuation of the brake can be had by said rotation of the housing, and said housing having a peripheral portion formed for engagement by a flexible drive element for the rotation of the housing from a remote region.

11. A vehicle brake system according to claim 2 in which there is a valve connected between said supply of air under pressure and the brake releasing sides of said air motor means having one position wherein air is supplied from the source to said brake releasing sides of the air motor means and a second position wherein the said brake releasing sides of the air motor means is exhausted to the atmosphere, a double acting fluid motor connected to said valve for actuating the same, means for supplying fluid under pressure to one side of said fluid motor to move said valve into its said one position, and a connection from said source to the other side of said fluid motor to move said valve into its said second position upon release of the pressure on said one side of said fluid motor.

12. A vehicle brake system according to claim 11 in which said valve includes manual means for effecting the shifting thereof from one position thereof to the other.

References Cited in the file of this patent
UNITED STATES PATENTS

| | | |
|---|---|---|
| 376,970 | Solano | Jan. 24, 1888 |
| 378,628 | Solano | Feb. 28, 1888 |
| 1,269,472 | McGeary | June 11, 1918 |
| 1,922,227 | Brecht | Aug. 15, 1933 |
| 2,777,546 | Kelley | Jan. 15, 1957 |
| 2,871,063 | Swander | Jan. 27, 1959 |
| 2,919,161 | Hammer | Dec. 29, 1959 |